US012534336B2

(12) United States Patent
Villa

(10) Patent No.: US 12,534,336 B2
(45) Date of Patent: Jan. 27, 2026

(54) DEVICE FOR CONTROLLING AN ELEVATOR SYSTEM

(71) Applicant: Inventio AG, Hergiswil (CH)

(72) Inventor: Valerio Villa, Colverde (IT)

(73) Assignee: INVENTIO AG, Hergiswil (CH)

( * ) Notice: Subject to any disclaimer, the term of this patent is extended or adjusted under 35 U.S.C. 154(b) by 793 days.

(21) Appl. No.: 17/906,753

(22) PCT Filed: Mar. 22, 2021

(86) PCT No.: PCT/EP2021/057251
§ 371 (c)(1),
(2) Date: Sep. 20, 2022

(87) PCT Pub. No.: WO2021/191138
PCT Pub. Date: Sep. 30, 2021

(65) Prior Publication Data

US 2023/0146042 A1 May 11, 2023

(30) Foreign Application Priority Data

Mar. 27, 2020 (EP) .................................... 20166386

(51) Int. Cl.
*B66B 1/34* (2006.01)
*B66B 5/00* (2006.01)
*B66B 5/02* (2006.01)

(52) U.S. Cl.
CPC .......... *B66B 1/3469* (2013.01); *B66B 5/0087* (2013.01); *B66B 5/027* (2013.01)

(58) Field of Classification Search
CPC .............................. B66B 5/027; B66B 5/0087
See application file for complete search history.

(56) References Cited

U.S. PATENT DOCUMENTS 6,484,850 B1 * 11/2002 Kobayashi ............ B66B 13/303 187/414
9,517,921 B2 * 12/2016 Stofira ...................... B66B 9/04
2005/0133313 A1 6/2005 Rossignol et al.
2015/0246792 A1 * 9/2015 Baltis ...................... B66B 5/005 187/276
2018/0222723 A1 * 8/2018 Gressien ............... B66B 5/0087
(Continued)

FOREIGN PATENT DOCUMENTS

CN 1270568 A 10/2000
CN 1328525 A 12/2001
(Continued)

*Primary Examiner* — Rina I Duda
(74) *Attorney, Agent, or Firm* — Shumaker, Loop & Kendrick, LLP

(57) ABSTRACT

A device for controlling an elevator system, the elevator system having an elevator shaft delimited by a shaft wall including a wall opening connecting an inner face of the shaft wall to an outer face of the shaft wall, is positioned in the wall opening. The device has a housing receiving a controller for controlling the elevator system, wherein the housing includes a housing opening allowing access to the controller and the housing is rotatably mounted in the wall opening for rotation between a first position and a second position in an operational state of the device. The housing opening is accessible from the outer face of the shaft wall in the first position and from the inner face of the shaft wall in the second position.

15 Claims, 3 Drawing Sheets

(56) References Cited

U.S. PATENT DOCUMENTS

| | | | |
|---|---|---|---|
| 2019/0023526 | A1 | 1/2019 | Rebillard et al. |
| 2019/0119072 | A1* | 4/2019 | Haapaniemi ............ B66B 1/466 |

FOREIGN PATENT DOCUMENTS

| | | | |
|---|---|---|---|
| CN | 1603223 | A | 4/2005 |
| CN | 1868848 | A | 11/2006 |
| CN | 107000998 | A | 8/2017 |
| EP | 0680921 | A2 | 11/1995 |
| EP | 0985626 | A2 | 3/2000 |
| EP | 1148018 | A1 | 10/2001 |
| JP | H01294178 | A | 11/1989 |
| JP | 2000211831 | A | 8/2000 |
| JP | 2002127387 | A | 5/2002 |
| JP | 2002370885 | A | 12/2002 |
| JP | 2007230727 | A | 9/2007 |
| SU | 1654214 | A1 | 6/1991 |
| WO | 0147798 | A1 | 7/2001 |
| WO | 02081353 | A1 | 10/2002 |

* cited by examiner

DEVICE FOR CONTROLLING AN ELEVATOR SYSTEM

FIELD

The present invention relates to a device and to a method for controlling an elevator system and to a corresponding elevator system.

BACKGROUND

An elevator system usually comprises an evacuation controller with which a car can be controlled manually to a stopping point in the event of a fire or a power failure for example. For safety reasons, the evacuation controller must be accessible outside of an elevator shaft in which the car is moving, since the car can block access to the elevator shaft in such cases.

At the same time, the elevator system should also be manually controllable inside the elevator shaft, for example to be able to carry out maintenance or inspection work in the elevator shaft.

SUMMARY

It is an object of the invention to improve the controller of an elevator system.

This object is achieved by a device, a method, and an elevator system according to advantageous embodiments defined in the following description.

A first aspect of the invention relates to a device for controlling an elevator system, wherein the elevator system comprises an elevator shaft which is delimited by a shaft wall, the shaft wall having a wall opening which connects an inner face of the shaft wall to an outer face of the shaft wall. The device comprises a housing for receiving a controller for controlling the elevator system, wherein the housing has a housing opening which allows access to the controller, and the housing is rotatably mounted in the wall opening between a first position and a second position in an operational state of the device. The housing opening is accessible from the outer face of the shaft wall in the first position and from the inner face of the shaft wall in the second position.

In other words, the housing opening can face the outer face of the shaft wall in the first position, so that the housing opening is accessible from the outer face, and in the second position can face the inner face of the shaft wall, so that the housing opening is accessible from the inner face or from the interior of the elevator shaft.

The wall opening and the housing can be dimensioned in such a way that an outer surface of the housing together with an inner surface of the wall opening forms a relatively small gap, so that, for example, a technician cannot reach past the housing through the wall opening, for example to operate the controller from the inner face when the housing is in the first position, i.e. the housing opening is rotated outward and vice versa.

The housing can, for example, be mounted so as to be pivoted horizontally or vertically. In particular, the housing can be cuboid. However, a cylindrical housing is also possible.

The wall opening can be closed, for example, on one or both sides with a fireproof cover. The cover can be removable or pivotable.

Depending on the position of the housing, it is possible for the controller to provide different types of controllers for controlling the elevator system, including, for example, an evacuation controller or an inspection controller. This is described in more detail below.

It is also conceivable, for example, that the housing can also be rotated into a third position in which the housing opening is accessible neither from the outer face of the shaft wall nor from the inner face of the shaft wall. The wall opening can be closed on both sides by a housing wall of the housing.

A device of this kind allows the elevator system to be reliably controlled both outside and inside the elevator shaft, without separate controllers being required for this purpose.

A second aspect of the invention relates to an elevator system which comprises an elevator shaft delimited by a shaft wall and a device as described above and below. The shaft wall has a wall opening that connects an inner face of the shaft wall to an outer face of the shaft wall. The housing of the device is rotatably mounted in the wall opening between the first position and the second position.

A third aspect of the invention relates to a method for controlling an elevator system, as described above and below. The method comprises the following steps: detecting whether the housing is in the first position or the second position by means of a position detection device; activating a first control mode for controlling the elevator system when the position detection device detects that the housing is in the first position; activating a second control mode for controlling the elevator system when the position detection device detects that the housing is in the second position.

Features of the device, as it is described above and below, can also be features of the method and vice versa.

Possible features and advantages of embodiments of the invention can be considered, inter alia and without limiting the invention, to be based upon the concepts and findings described below.

According to one embodiment, the device further comprises a position detection device, which is designed to detect whether the housing is in the first position or the second position, and the controller, which is received in the housing and is designed to activate a first control mode for controlling the elevator system, when the position detection device detects that the housing is in the first position, and to activate a second control mode for controlling the elevator system when the position detection device detects that the housing is in the second position.

The position detection device can, for example, comprise a switch or an arrangement of a plurality of switches which can be actuated by rotating the housing into the first or second position. Additionally or alternatively, the position detection device can comprise one or more sensors for detecting a position of the housing.

The two control modes can differ from one another. In particular, in the second control mode, i.e. when the controller is accessible from the inside, specific safety-critical functions of the controller can be deactivated, such as a function for manually moving a car or the like, in order not to endanger a technician located in the elevator shaft.

According to one embodiment, the controller in the second control mode prevents manual activation of the first control mode. In this way, it can be avoided that functions of the controller are activated in the second control mode, which could endanger the safety of the technician located in the elevator shaft.

According to one embodiment, the controller in the first control mode prevents manual activation of the second control mode. For example—if the controller is only accessible from the outside, i.e. the technician is outside the elevator shaft—specific functions that require visual contact with components inside the elevator shaft are excluded from the controller.

According to one embodiment, the controller allows a safety circuit of the elevator system to be bypassed in the first control mode. A drive of the elevator system can be supplied with power via the safety circuit. If the safety circuit is interrupted under specific operating conditions, it can still be bypassed manually, for example by means of an inspection or evacuation controller. The controller can be designed to allow a bypass of this kind, provided it is ensured that the technician is outside the elevator shaft. This is then ensured when the housing opening is in the first position, i.e. is rotated outward and thus the first control mode is active.

According to one embodiment, the controller prevents a safety circuit of the elevator system from being bypassed in the second control mode. This can prevent the drive of the elevator system from being set in motion by means of the controller, i.e. a car is moved while the technician is in the elevator shaft.

According to one embodiment, the controller allows switching over of the elevator system to normal operation in the first control mode.

According to one embodiment, the controller in the second control mode prevents the elevator system from switching over to normal operation.

This can also prevent the technician located in the elevator shaft from being endangered by a moving car.

According to one embodiment, the housing opening is not accessible from the inner face of the shaft wall in the first position. It can thus be ruled out that the controller is operated from the inside, when it should actually only be operated from the outside.

According to one embodiment, the housing opening is not accessible from the outside of the shaft wall in the second position. It can thus be ruled out that the controller is operated from the outside when it should actually only be operated from the inside.

According to one embodiment, the housing can only be rotated in one direction. In this way, unintentional adjustment of the housing can be avoided. For example, it can also be achieved that the technician has to leave the elevator shaft in order to turn the housing from the second position back to the first position.

According to one embodiment, the device further comprises a locking mechanism that blocks a movement of the housing between the first position and the second position in a locked state and releases it in an unlocked state. The locking mechanism can be adjusted manually between the locked state and the unlocked state. For example, the housing can be rotatable from both sides of the shaft wall from the first position to the second position, i.e. from outside to inside. In order to prevent the housing from rotating starting from the outer face of the shaft wall from the second position back to the first position, i.e. inside out, the device may comprise a latching mechanism that restricts rotation of the housing. Such a latching mechanism can, similar to a cable tie, comprise a latch and a counterpart that can be moved relative to the latch and in which the latch engages in a form-fitting manner, so that the housing can only be rotated in a specific direction. The latching mechanism can be manually released by the technician, for example by lifting the latch so that the housing can also be rotated in the other direction. The latching mechanism can be designed in such a way that it can only be released inside the elevator shaft, for example by the latch being accessible only from the inner face of the shaft wall.

According to one embodiment, the device also comprises a lockable housing door for closing the housing opening. The housing door can be movably attached to the housing in order to close the housing opening there. It is also possible for the housing door to be movably attached to the outer face of the shaft wall in order to close the wall opening there and thus prevent access to the housing opening. For example, the device can also comprise a first housing door for closing the wall opening on the outer face of the shaft wall and a second housing door for closing the wall opening on the inner face of the shaft wall.

DESCRIPTION OF THE DRAWINGS

Embodiments of the invention will be described in the following with reference to the accompanying drawings, although neither the drawings nor the description should be construed as limiting the invention. In the drawings.

The drawings are merely schematic and not to scale. Like reference signs denote like or equivalent features in the various drawings.

DETAILED DESCRIPTION

Figure 1:
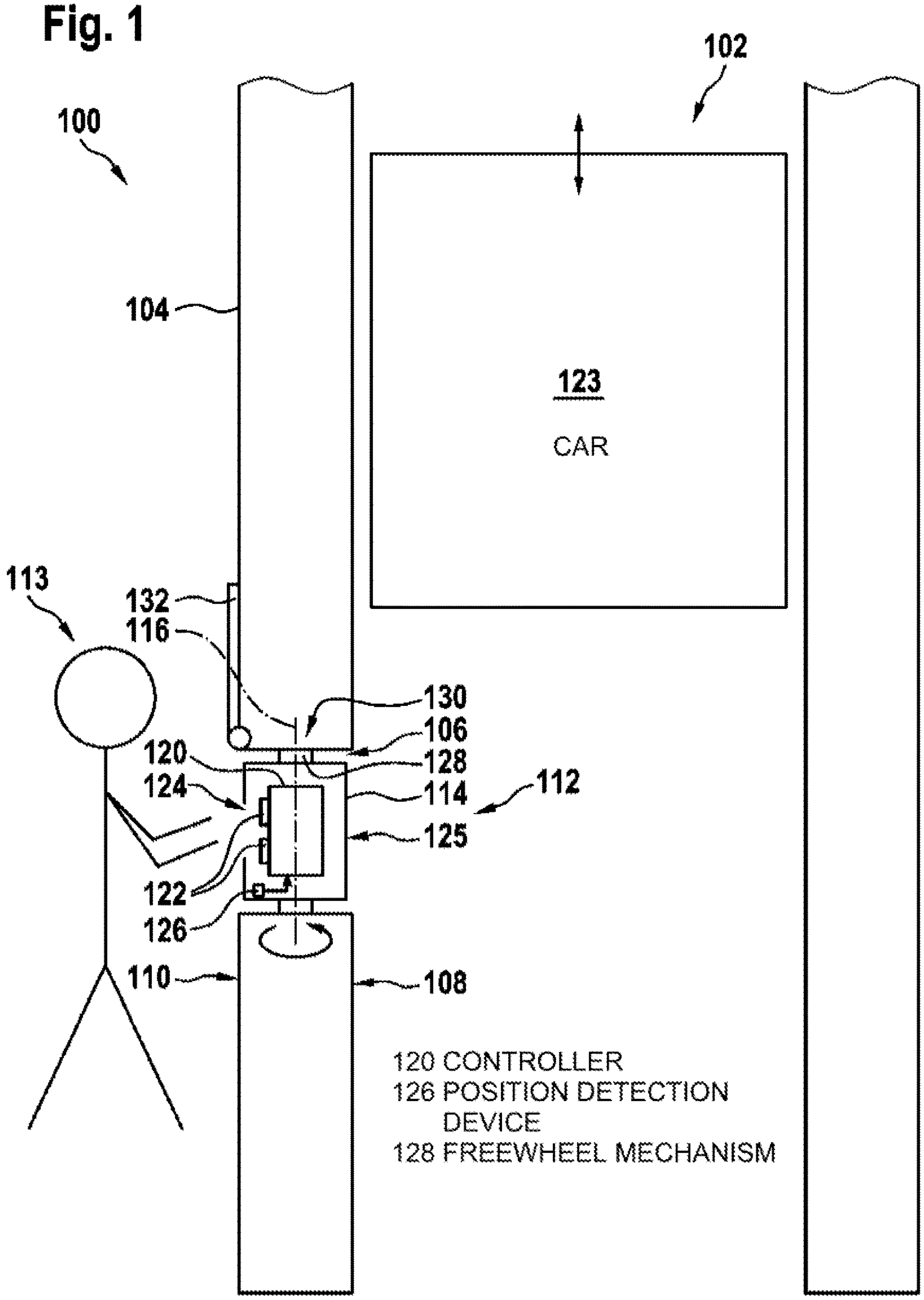
FIG. 1: is an elevator system according to an embodiment.

FIG. 1 shows an elevator system 100 having an elevator shaft 102 which is delimited by a shaft wall 104. The shaft wall 104 has a continuous wall opening 106 which connects an inner face 108 of the shaft wall 104 to an outer face 110 of the shaft wall 104. The elevator system 100 also comprises a device 112 for manually controlling the elevator system 100 by a technician 113.

The wall opening 106 can be located next to a door opening in the shaft wall 104, for example. It is also conceivable that the wall opening 106 is located in the region of a shaft pit or in an upper region of the elevator shaft 102.

The device 112 allows controlling the elevator system 100 from the outer face 110 on the one hand and from the inner face 108 on the other hand. For this purpose, the device 112 has a housing 114 which is mounted within the wall opening 106 so as to be rotatable about an axis of rotation 116 between a first position and a second position. The axis of rotation 116 can be aligned transversely to a longitudinal axis of the wall opening 106, for example horizontally or vertically. In FIG. 1, the axis of rotation 116 is oriented vertically, for example.

A controller 120 with various operating elements 122 for operating the elevator system 100 by the technician 113 is arranged in the housing 114. For example, the operating elements 122 can comprise a rotary switch for switching over between a normal operation and a special operation such as a maintenance or evacuation mode, a button for enabling a movement of a car 123, and buttons for specifying a direction of travel of the car 123.

The housing 114 has a housing opening 124 through which the technician 113 can access the operating elements 122 inside the housing 114.

In order to be able to access the controller 120 or the operating elements 122 from the outer face 110, the technician 113 rotates the housing 114 into the first position in which the housing opening 124 faces the outer face 110, as is shown in FIG. 1. In order to be able to access the controller 120 or the operating elements 122 from the inner face 108, the technician 113 rotates the housing 114 into the second position in which the housing opening 124 faces the inner face 108.

Additionally or alternatively to the housing 114, the operating elements 122 can be mounted at least partially so that they can rotate between a first position and a second position, wherein the operating elements 122 are accessible from the outer face 110 in the first position and from the inner face 108 in the second position.

For example, the housing 114 can have a closed housing wall 125 on a side opposite the housing opening 124, which side faces the inner face 108 in the first position, in order to close the wall opening 106 on the inner face 108 in such a way that the technician 113 cannot reach the housing opening 124 from the inner face 108, or faces the outer face 110 in the second position, in order to close the wall opening 106 on the outer face 110 in such a way that the technician 113 cannot reach the housing opening 124 from the outer face 110.

In addition, the housing wall 125 can be given an appearance of the shaft wall 104, i.e. be adapted to the color or structure thereof, by means of a corresponding decoration. The housing wall 125 can thus be integrated into the shaft wall 104 inconspicuously.

It is also possible for the housing wall 125 to be flush with the outer face 110 in the second position. Additionally or alternatively, the housing wall 125 can terminate flush with the inner face 108 in the first position.

The device 112 can comprise a position detection device 126 which is designed to detect whether the housing 114 is in the first position or in the second position. For example, the position detection device 126 can have a switch that is actuated by the housing 114 and generates a corresponding switching signal as soon as the housing 114 assumes the first position. Based on the switching signal, the controller 120 can activate a first control mode. For example, the first control mode can be activated as long as the switching signal is present at the controller 120. If the housing 114 leaves the first position, the switch returns to its rest position and no longer generates a switching signal. Accordingly, the controller 120 deactivates the first control mode and activates a second control mode instead, which is used to control the elevator system 100 from the elevator shaft 102.

The position detection device 126 may also comprise a plurality of such switches, for example a first switch for signaling that the housing 114 is in the first position, and a second switch for signaling that the housing 114 is in the second position. Additionally or alternatively to such switches, the position detection device 126 can comprise a suitable sensor for detecting a corresponding position of the housing 114.

The control modes can differ, for example, in that in the first control mode a safety circuit, which in the closed state supplies a drive of the elevator system 100 with power, can be bypassed, while this is not possible in the second control mode (the safety circuit is usually interrupted under specific operating conditions that deviate from normal driving operation, for example in the event of a malfunction or when an inspection is carried out). This can prevent the drive from being set in motion while the technician 113 is in the elevator shaft 102.

Furthermore, the controller 120 can be configured in such a way that a switching over of the elevator system 100 to normal operation is only possible in the first control mode, i.e. only if the controller 120 is accessible from the outer face 110.

The elevator system 100 can be controlled by a higher-level elevator controller that is connected to the safety circuit and performs various functions by interrupting or bypassing parts of the safety circuit. The controller 122 can inform the elevator controller which control mode is active at any given time. Depending on the control mode, the elevator controller can, for example, activate or deactivate specific current paths in the safety circuit. For example, the first control mode can be a mode for an emergency electrical operation and the second control mode can be a mode for a pit inspection.

For example, upon rotating the housing 114 to the second position, the elevator controller may disable a bypass path for electrical emergency operation. In this way, the safety circuit can only be closed if none of the safety switches in the safety circuit have tripped.

The elevator controller or the controller 122 can be implemented as a software and/or hardware module.

For example, the housing 114 may be coupled to a freewheel mechanism 128 that causes the housing 114 to rotate in only one direction.

Additionally or alternatively, the device 112 may comprise a manually adjustable locking mechanism 130 that blocks a movement of the housing 114 between the first position and the second position in a locked state and releases it in an unlocked state.

For example, the housing 114 may be fixed in either the first position or the second position in the locked state.

The locking mechanism 130 may only be released using a special key, for example.

It is possible for the locking mechanism 130 to be integrated into the freewheel mechanism 128.

In order to prevent unauthorized persons from being able to access the controller 120, the housing opening 124 can be closed with a housing door 132. For example, the housing door 132 is movably mounted on the shaft wall 104 and, in the closed state, covers the entire wall opening 106 at the outer face 110. The housing door 132 can be lockable. Similar to the housing wall 125, the housing door 132 can have a decoration imitating the shaft wall 104 on its outer face.

Figure 2:
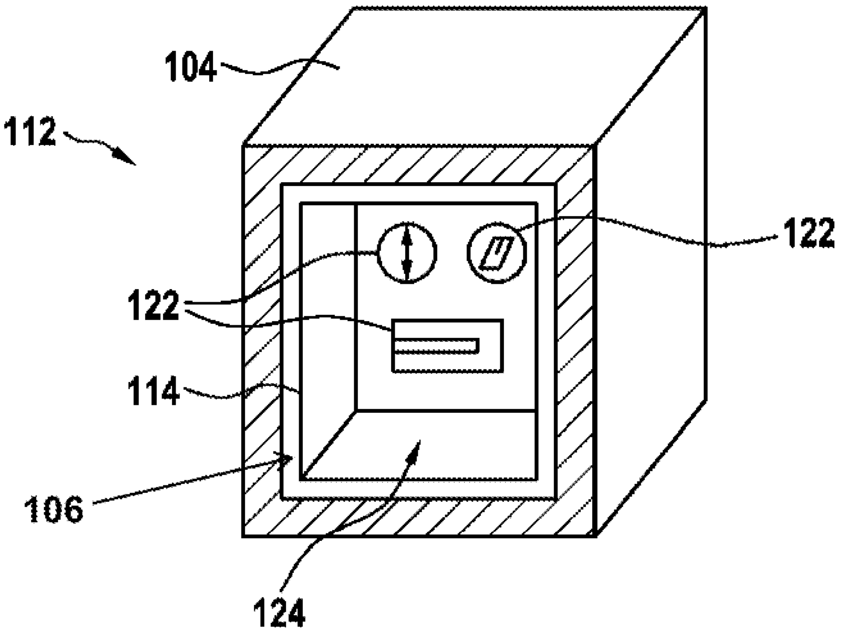
FIG. 2: is a housing of FIG. 1 in the first position.

FIG. 2 shows the wall opening 106 viewed from the outer face 110. As already shown in FIG. 1, the housing 114 is in the first position. The individual operating elements 122, which are freely accessible through the housing opening 124, can be seen.

Figure 3:
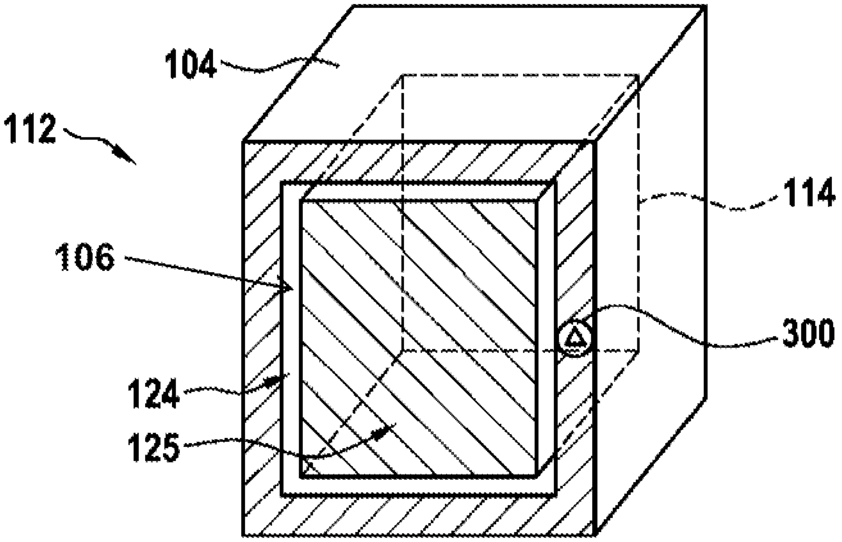
FIG. 3: is a housing of FIG. 1 in the second position.

FIG. 3 shows the wall opening 106 in the same view as in FIG. 2, with the difference that in this case the housing 114 is rotated to the second position. It can be seen how the wall opening 106 is closed by the housing wall 125 in the second position. A lock 300 for a special key for locking or unlocking the housing 114 by means of the locking mechanism 130 is also shown.

Figure 4:
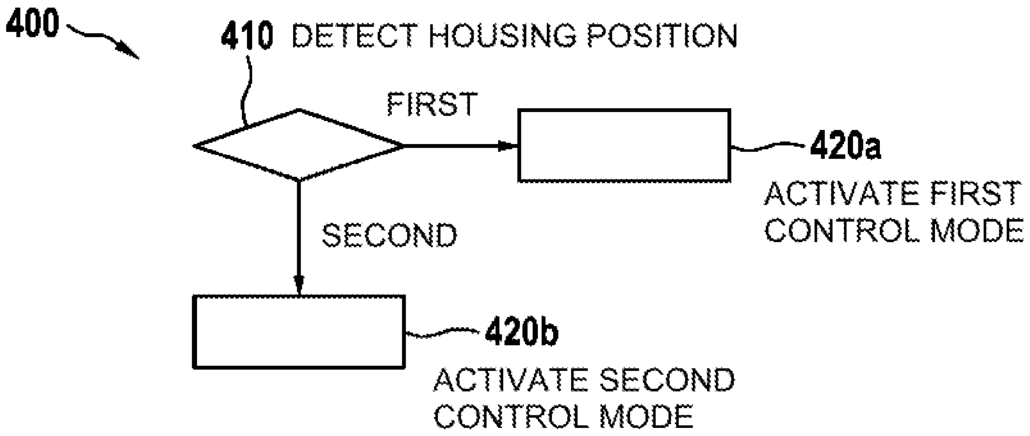
FIG. 4: is a flow chart for a method according to one embodiment of the invention.

FIG. 4 shows a flow chart of a method 400 for controlling the elevator system 100, as can be carried out by the device 112 from FIGS. 1 to 3.

In a first step 410, it is detected by the position detection device 126 whether the housing 114 is in the first position or the second position.

If it is detected that the housing 114 is in the first position, the first control mode is activated in a second step 420*a*.

Alternatively, the second control mode is activated in a second step 420*b* if it is detected that the housing 114 is in the second position.

Finally, it should be noted that terms such as "comprising," "including," etc. do not preclude other elements or steps, and terms such as "a" or "an" do not preclude a plurality. Furthermore, it should be noted that features or steps that have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A device for controlling an elevator system, the elevator system including an elevator shaft delimited by a shaft wall, the shaft wall having a wall opening formed therein that connects an inner face of the shaft wall to an outer face of the shaft wall, the device comprising:

a housing in which a controller for controlling the elevator system is received;

wherein the housing has a housing opening allowing access to the controller, and wherein the housing is rotatably mounted in the wall opening for rotation between a first position and a second position in an operational state of the device; and wherein the housing opening is accessible from the outer face of the shaft wall when the housing is in the first position and the housing opening is accessible from the inner face of the shaft wall when the housing is in the second position.

2. The device according to claim 1 including a position detection device that detects whether the housing is in the first position or the second position, and wherein the controller is activated in a first control mode for controlling the elevator system when the position detection device detects that the housing is in the first position, and the controller is activated in a second control mode for controlling the elevator system when the position detection device detects that the housing is in the second position.

3. The device according to claim 2 wherein a bypass of a safety circuit of the elevator system is allowed when the controller is in the first control mode.

4. The device according to either claim 2 wherein a bypass of a safety circuit of the elevator system is prevented when the controller is in the second control mode.

5. The device according to any of claim 2 wherein a switching over of the elevator system to normal operation is allowed when the controller is in the first control mode.

6. The device according to claim 2 wherein a switching over of the elevator system to normal operation is prevented when the controller is in the second control mode.

7. The device according to claim 2 wherein a manual activation of the first control mode is prevented when the controller is in the second control mode.

8. The device according to claim 2 wherein a manual activation of the second control mode is prevented when the controller is in the first control mode.

9. The device according to claim 1 wherein the housing opening is not accessible from the inner face of the shaft wall when the housing is in the first position.

10. The device according to claim 1 wherein the housing opening is not accessible from the outer face of the shaft wall when the housing is in the second position.

11. The device according to claim 1 wherein the housing is rotatable in only one direction.

12. The device according to claim 1 including a locking mechanism that, in a locked state, blocks a movement of the housing between the first position and the second position and allows the movement in an unlocked state of the locking mechanism, and wherein the locking mechanism is manually adjustable between the locked state and the unlocked state.

13. The device according to claim 1 including a lockable housing door adapted to selectively close the housing opening.

14. An elevator system comprising:

an elevator shaft delimited by a shaft wall, the shaft wall having a wall opening connecting an inner face of the shaft wall to an outer face of the shaft wall; and the device according to claim 1 wherein the housing of the device is rotatably mounted in the wall opening and is rotatable between the first position and the second position.

15. A method for controlling the elevator system according to claim 14, the method comprising the steps of:

detecting whether the housing is in the first position or in the second position by a position detection device;

activating the controller in a first control mode for controlling the elevator system when the position detection device detects that the housing is in the first position; and activating the controller in a second control mode for controlling the elevator system when the position detection device detects that the housing is in the second position.

* * * * *